(12) United States Patent
Cormier et al.

(10) Patent No.: US 8,769,919 B2
(45) Date of Patent: Jul. 8, 2014

(54) CROP HARVESTING HEADER WITH SEALING MEMBER BETWEEN DRAPER AND CUTTER BAR

(71) Applicant: MacDon Industries Ltd., Winnipeg (CA)

(72) Inventors: Daniel Cormier, Winnipeg (CA); Francois R. Talbot, Winnipeg (CA)

(73) Assignee: MacDon Industries Ltd, Wpg MB (CA)

( * ) Notice: Subject to any disclaimer, the term of this patent is extended or adjusted under 35 U.S.C. 154(b) by 0 days.

(21) Appl. No.: 13/914,141

(22) Filed: Jun. 10, 2013

(65) Prior Publication Data

US 2014/0059996 A1    Mar. 6, 2014

Related U.S. Application Data (63) Continuation of application No. 13/601,339, filed on Aug. 31, 2012, now Pat. No. 8,484,939.

(51) Int. Cl.
*A01D 43/00*    (2006.01)

(52) U.S. Cl.
USPC ............................................ 56/181

(58) Field of Classification Search
USPC ........... 56/181, 158, 208, 14.5; 198/699, 841, 198/523
See application file for complete search history.

(56) References Cited

U.S. PATENT DOCUMENTS

| | | | | | |
|---|---|---|---|---|---|
| 1,862,101 | A | * | 6/1932 | Pax | 198/523 |
| RE21,604 | E | * | 10/1940 | Hume et al. | 56/158 |
| 2,235,602 | A | * | 3/1941 | Biesemeyer | 56/181 |
| 2,237,517 | A | * | 4/1941 | Anderson | 56/185 |
| 2,347,365 | A | * | 4/1944 | Paradise | 198/699 |
| 2,720,743 | A | * | 10/1955 | Prather | 56/207 |
| 2,795,922 | A | * | 6/1957 | Hume | 56/257 |
| 2,999,348 | A | * | 9/1961 | Cunningham | 56/16.4 R |
| 4,198,803 | A | * | 4/1980 | Quick et al. | 56/296 |
| 4,199,925 | A | * | 4/1980 | Quick et al. | 56/208 |
| 5,459,986 | A | | 10/1995 | Talbot | |
| 6,351,931 | B1 | * | 3/2002 | Shearer | 56/181 |
| 6,675,568 | B2 | * | 1/2004 | Patterson et al. | 56/208 |
| 7,401,458 | B2 | * | 7/2008 | Priepke | 56/296 |
| 7,412,816 | B2 | * | 8/2008 | Coers et al. | 56/208 |
| 7,467,506 | B2 | * | 12/2008 | Lovett et al. | 56/15.8 |
| 7,472,533 | B2 | | 1/2009 | Talbot et al. | |
| 7,478,521 | B2 | * | 1/2009 | Coers et al. | 56/208 |
| 7,520,118 | B1 | * | 4/2009 | Priepke | 56/257 |
| 7,549,280 | B2 | * | 6/2009 | Lovett et al. | 56/208 |
| 7,591,127 | B1 | * | 9/2009 | Stacer et al. | 56/12.9 |
| 7,600,364 | B2 | * | 10/2009 | Lovett et al. | 56/181 |
| 7,908,836 | B1 | * | 3/2011 | Rayfield et al. | 56/181 |
| 7,937,920 | B2 | * | 5/2011 | Schmidt et al. | 56/181 |

(Continued)

*Primary Examiner* — Árpád Fábián-Kovács
(74) *Attorney, Agent, or Firm* — Adrian D. Battison; Ade & Company Inc (57) ABSTRACT

A crop harvesting header with a cutter bar and a draper assembly has a draper which includes a front edge of the upper run of the draper arranged at a position adjacent to but spaced from the cutter bar and there is provided a sealing member extending along the cutter bar. The sealing member is co-extruded to form a constant cross-sectional shape along the full length and to define a first portion of a stiffer plastics material attached to the cutter bar and a second blade portion of a more flexible plastics material which extends rearwardly from the first portion at the cutter bar to lie over and in contact with a bead along a front edge portion of the draper.

17 Claims, 5 Drawing Sheets

(56) References Cited

U.S. PATENT DOCUMENTS

| | | |
|---|---|---|
| 7,958,711 B1 * | 6/2011 | Sauerwein ................. 56/181 |
| 7,971,418 B2 * | 7/2011 | Conrad et al. ............. 56/181 |
| 7,992,374 B1 * | 8/2011 | Bich et al. ................. 56/208 |
| 8,091,330 B2 * | 1/2012 | Lohrentz et al. .......... 56/181 |
| 8,191,344 B2 * | 6/2012 | Sauerwein ................. 56/181 |
| 8,205,421 B2 * | 6/2012 | Sauerwein et al. ........ 56/181 |
| 8,230,670 B2 * | 7/2012 | Schmidt et al. ........... 56/208 |
| 8,291,686 B1 * | 10/2012 | Cormier et al. ............ 56/181 |
| 8,341,929 B2 * | 1/2013 | Sauerwein et al. ........ 56/181 |
| 2002/0129591 A1 * | 9/2002 | Patterson et al. ......... 56/158 |
| 2008/0092508 A1 * | 4/2008 | Talbot et al. .............. 56/181 |
| 2009/0266044 A1 * | 10/2009 | Coers et al. ............... 56/208 |
| 2011/0131940 A1 * | 6/2011 | Lohrentz et al. .......... 56/181 |
| 2011/0308221 A1 * | 12/2011 | Sauerwein et al. ........ 56/181 |

* cited by examiner

CROP HARVESTING HEADER WITH SEALING MEMBER BETWEEN DRAPER AND CUTTER BAR

This application is a continuation of application Ser. No. 13/601,339 filed Aug. 31, 2012 and now issued as U.S. Pat. No. 8,489,939.

This invention relates to a method of cutting and transporting a standing crop and particularly to a method of sealing between a front edge of the draper and the cutter bar.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper forming a continuous loop of flexible material wrapped around the rollers so as to define a front edge of the draper adjacent the cutter bar, a rear edge of the draper spaced rearwardly of the cutter bar, an upper run of the draper on top of the roller and a lower run of the draper below the rollers. The cut crop thus falls rearwardly onto the upper run of the draper and is transported longitudinally of the header. Between the two end draper rollers there is provided a support plate assembly for supporting the upper run of the draper to prevent sagging.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper normally comprises a fabric which is coated with a rubber material which is then vulcanized after forming of the fabric into the required shape and after attachment thereto of transverse slats.

The arrangement shown in U.S. Pat. No. 5,459,986 (Talbot) issued Oct. 24, 1995 and assigned to the present Assignees has achieved significant success and has been used for many years. It provides a seal between an under surface of a rearwardly extending element of the cutter bar and a front edge portion of the upper surface of the draper.

Not shown in the above patent is the conventional guiding arrangement to prevent misalignment of the draper on the rollers and this is provided by a bead located on the underside of the draper which runs in a groove in the roller.

An alternative arrangement is shown in U.S. Pat. No. 7,472,533 (Talbot et al) issued Jan. 6, 2009 also of the present Assignees and originally published Apr. 24, 2008. This provides a crop harvesting header with a cutter bar and a draper with a plurality of transverse slats and a resilient strip across a front edge of the outer surface in front of the front end of the slats to cooperate with a rearwardly projecting element of the cutter bar extending over the upper run of the draper to engage the upper surface of said strip to form a seal to inhibit entry between the cutter bar and the draper of materials carried by the cut crop. There is also provided a bead on the draper on the surface opposite the strip within the width of the strip. The arrangement can be symmetrical with a strip at each of the front and rear edges spanned by the slats extending between them, with beads on each edge opposite the front and rear strips respectively.

The disclosures of the above patents are incorporated herein by reference or may be referred to for details of the construction not provided herein.

SUMMARY OF THE INVENTION

It is one object of the invention to provide an improved draper assembly.

According to the invention there is provided a crop header arranged for cutting and transporting a standing crop comprising:

a header frame;

an elongate cutter bar arranged along a front edge of the frame;

a draper assembly mounted on the header frame rearwardly of the cutter bar such that cut crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

wherein the draper canvas forms a continuous loop of flexible material arranged to be wrapped around the rollers so as to define an upper run of the draper canvas on top of the rollers and a lower run of the draper canvas below the rollers;

wherein the draper canvas includes a front edge of the upper run of the draper canvas arranged at a position adjacent to but spaced from the cutter bar;

and wherein there is provided an integral extruded sealing member extending along the cutter bar defining a first portion attached to the cutter bar and a second flexible blade portion which extends rearwardly from the first portion at the cutter bar to lie over and in contact with a front edge portion of the canvas at the front edge.

Preferably the first portion is stiffer for attachment to the cutter bar than the second flexible blade portion.

Preferably the second flexible blade portion transitions in the co-extruded materials to the first portion at the cutter bar so that the whole of the second flexible blade portion from the cutter bar can flex upwardly and downwardly.

Preferably the front edge portion of the draper includes a thickened layer of rubber so that an underside of the second flexible portion runs along an upper surface of the thickened layer of rubber.

Preferably the first portion includes an upper leg lying along a top surface of the cutter bar and a depending leg extending downwardly at a rear surface of the cutter bar between the rear surface and the front edge of the draper.

Preferably the second blade portion is connected to the first portion at a junction between the upper leg lying along a top surface of the cutter bar and the depending leg. This leg or lip acts to prevent dirt entering between the cutter bar and the seal.

Preferably the first portion includes an arch shaped portion depending downwardly at a front of the cutter bar so as to cover upper and front surfaces of the cutter bar.

Preferably the first portion is bolted in place on the cutter bar at spaced positions along the cutter bar.

Preferably the second blade portion is free to flex upwardly and downwardly at all positions therealong from the cutter bar rearwardly.

Preferably there is provided a support surface for engaging the draper rearwardly of the front edge so that a front edge portion of the draper is cantilevered beyond the support surface and the second blade portion contacts the draper at the cantilevered front edge portion. The second flexible blade portion remains in contact with the edge of the draper whether or not the draper sags into engagement with the support surface.

It will be appreciated that the term "draper canvas" is a traditional term based upon the canvas material from which the "draper" was made but that this term no longer provides any indication of nor limitation to the use of particular materials for the base fabric from which the "draper" is made. Many synthetic materials can thus be used. Commonly the draper is coated with a rubber layer and again many different resilient coating materials can be used and no limitation is intended herein in this regard. The increased thickness at the edge portion described above can be made of the same material as the remaining rubber covering or may be a strip of a different material of different chemical structure or of different characteristics.

While the knife used with the cutter bar is usually of the sickle knife type including a plurality of knife guards mounted on the cutter bar, other types of knife can also be used.

BRIEF DESCRIPTION OF THE DRAWINGS

In the drawings like characters of reference indicate corresponding parts in the different figures.

DETAILED DESCRIPTION

The following description relates only those parts of the header which are of importance to the present invention and the remaining parts of the header including the frame structure, drives, ground wheels and the like are omitted as these will be well known to one skilled in the art.

The header therefore comprises a frame 10, one element 10A of which is in the form of a beam extending horizontally and forwardly from a rear support frame structure 10B to a cutter bar assembly generally indicated at 11 for support of that cutter bar assembly across the front of the header. The beam 10A (omitted from FIG. 1) forms one of a plurality of such beams arranged at spaced positions along the length of the header frame so as to support the cutter bar assembly 11 as an elongate structure across the front edge of the header.

The cutter bar comprises a generally Y-shaped beam 12 with a leg 12C and two arms 12D and 12E. The beam is formed from two components 12A and 12B welded together at the leg 12C, where the leg provides structural support for the cutter bar elements including the guards and sickle bar which are omitted from the drawings. The knife guards are of course of well-known construction and carry a sickle knife assembly having a longitudinally reciprocating bar driving a plurality of triangular knife blades which sit on the knife guards and reciprocate back and forth across the knife guards in a cutting action.

The leg 12E of the cutter bar support beam 12 includes a portion 12F extending upwardly and rearwardly from the flange 12C to an upper generally rearwardly extending top wall 12G which extends to a rear apex 12K. At the apex the top wall 12G connects with an L-shaped hanger portion 12H including a vertical extending plate 12L and a forwardly extending generally horizontal flange 12J projecting toward but not meeting the wall 12F.

The leg 12D forms a rearwardly and downwardly extending wall which acts as a skid plate when the cutter bar is cutting on the ground. The plate may be covered by a protective plastics wear shield (not shown).

The draper assembly generally indicated at DA includes a first draper support roller 30 and a second draper support roller 30A. One of these rollers is driven by a drive motor 30B to effect rotation of the draper in conventional manner. The draper assembly further includes a draper 32 in the form of a continuous loop or band of fabric which is wrapped around the rollers at respective ends to form an upper run 33 of the draper on top of the rollers and a lower run 34 of the draper underneath the rollers. The rollers are thus spaced longitudinally of the cutter bar and arranged with their axes of rotation parallel and at right angles to the cutter bar. The draper 32 has an inner drive surface 304 engaging an outer surface of the rollers 30, 30A. The draper thus includes a front edge 35 of the upper run which is adjacent the cutter bar and a rear edge 36 of the upper run 33 which is remote from the cutter bar and spaced rearwardly therefrom thus defining therebetween a flat surface of the upper run for transportation of the crop longitudinally of the header. The lower run 34 also includes a front edge 37 and a rear edge. The draper includes a plurality of conventional transverse slats 39 which assist in carrying the crop along the draper. Each edge of the draper can include a conventional folded seam so as to define a portion of the draper material which is folded back with that folded back portion being folded back on top of the fabric layer and bonded to the draper by the vulcanization effect in the manufacture of the draper.

The upper run of the draper is supported by a front plate assembly 45 which includes a horizontal top plate portion 46 laying underneath the upper run of the draper adjacent the front edge 35 for supporting that front edge in sliding movement across the top surface of that plate. The support plate 46 is carried on a cross channel 47 defined by the plate portion 46 which forms the upper plate of a C-shaped channel member 48 including vertical wall 49 and bottom wall 50. This is welded to an angle bracket 51 defined by a horizontal plate 52 and a vertical plate 53 where the plate 52 is welded to the bottom wall 50 and the top of the plate 53 is welded to the plate 46 at a position spaced rearwardly from its front edge. In this way the support plate is essentially self-supporting and is carried on cast hook-shaped mounting members 55 from the flange 12J.

The rollers 30, 30A are carried on the angle bracket 51 and the support plate 46. Further details of the brackets and support elements are described in the above patent of Talbot.

The front edge 46A of the support plate 46 is spaced rearwardly from the front edge 35 of the upper run of the draper so that the forwardmost edge portion of the draper is cantilevered forwardly from the front edge 46A. The front edge 46A of the support plate 46 is located adjacent but spaced rearwardly from the vertical plate 12L slightly below the apex 12K. Thus the upper run of the draper lies across the plate 46 and extends beyond the edge 46A to a position closely adjacent the apex 12K. The draper at the edge 35 includes a band of rubber or increased thickness relative to the main portion of the draper so as to provide a rubber wear bead 35A with a flat upper surface parallel to the body of the draper along the edge.

In order to provide a seal between the front edge of the draper and the upper leg 12E of the cutter bar 12, there is provided an integral extruded sealing member 60 extending along the cutter bar 12 defining a first portion 61 attached to the cutter bar and a second flexible blade portion 62 which extends rearwardly from the first portion at the cutter bar to lie over and in contact with the flat upper surface of the bead 35A at the front edge portion 35 of the draper 32 at the front edge 35.

The first portion 61 is arranged for attachment by bolts 63 at spaced positions along the cutter bar and is formed of a co-extruded plastic material which is stiffer than the flexible second blade portion 62. Thus the flexible second blade portion 62 transitions to the first portion at a transition 64 located at apex 12K of the cutter bar 12 so that the whole of the first blade portion 62 from the cutter bar 12 extending rearwardly can flex upwardly and downwardly as indicated at 62A.

As explained previously the front edge portion 35 of the draper may include an optional thickened layer of rubber 35A so that a flat underside 62B of the second flexible portion 62 runs along an upper surface of the thickened layer of rubber as the upper run of the draper moves longitudinally of the cutter bar 12. The thickened layer of rubber if used can provide a dam for dirt trickling forwardly down the draper so that it is blocked and carried to the end without reaching the seal.

In order to effectively and fixedly locate the flexible blade portion at the apex 12K, the first portion 61 includes an upper leg 61A lying along the top surface 12G of the cutter bar 12 and a depending leg 61B extending downwardly along the rear surface 12M of the vertical plate 12L the cutter bar 12 between the rear surface 12M and the front edge of the draper 35. The second blade portion 62 is connected to the first portion 61 at the apex 12K that is at the junction between the upper leg 61A lying along the top surface 12G of the cutter bar and the depending leg 61B. In order to match a generally arch shape of the wall 12G and the depending front wall 12E, the first portion includes an arch shaped portion with a top horizontal portion and a front portion 61C depending downwardly at a front of the cutter bar to a front edge 61D so as to cover upper and front surfaces of the cutter bar. The first portion is thus bolted in place on the cutter bar at spaced positions along the cutter bar and the second blade portion is free to flex upwardly and downwardly at all positions therealong from the cutter bar rearwardly.

As described previously there is provided a support surface 46 for engaging the draper rearwardly of the front edge 35 in the event that the draper sags so that a front edge portion 35A of the draper is cantilevered beyond the support surface 46 so that the second blade portion contacts the draper at the cantilevered front edge portion defined by the bead 35A.

This seal therefore inhibits the build-up of materials inside the cutter bar 12 and between the draper upper run and lower run and around the draper rollers which can of course cause damage.

At the rear edge 36, the draper is guided on the draper roller by a V groove in the roller 30 into which projects from the back of the draper a V-shaped guide rib 75 which runs along the inner surface of the draper along its full length. Thus the draper as shown is typically not symmetrical which would allow the draper to be reversed by rotating the draper so that the front edge is turned to become the rear edge and vice versa.

The draper can be of the construction shown in the above patent of Talbot which includes a base layer or sheet which is formed of a fabric sheet which is folded at its edge to form a portion which is folded back on top of the layer to form an end edge of the folded back portion which lies on top of the fabric of the layer spaced away from the edge. The draper carries a coating or infused rubberized layer in a conventional manner. At the edge is provided the strip or bead 35A of a resilient material. The resilient material is preferably of the same construction as the rubberized coating so that it can be vulcanized with the structure of the draper and molded in place as part of the manufacturing process. The strip 35A has a front edge which is at or immediately adjacent the edge of the base layer of the draper. The strip 35A has an upper surface which is flat and smooth. Thus the strip is rectangular with vertical side edges and the top surface horizontal. However the strip may be shaped with inclined or tapered side edges.

In the example shown the strip 35A has the width of the order of 1" (25 mm) and a height of the order of ⅛" (4.0 mm). The strip thus stands up from the upper surface of the base layer of the draper that is the upper surface of the folded back portion.

The draper also carries slats 39 which stand upwardly from the upper surface of the draper to a top edge 39A which is at a height significantly greater than the height of the strip base layer of fabric and rubber forming the draper. Each slat extends transversely across the draper to a position closely adjacent the strip 35A at the front edge of the draper. Thus each slat extends to an end edge 39B which is spaced from the side edge 35. The slats 39 are molded integrally with the strip 35A.

The presence of the strip 35A provides an improved sealing effect between the surface of the strip and the surface 62B of the blade portion 62 due to an increase in pressure therebetween. In addition the presence of a shoulder at the edge of the bead 35A provides a raised surface standing upwardly from surface of the draper to inhibit the penetration of material into the space between the surfaces bead and the plate portion.

Figure 1:
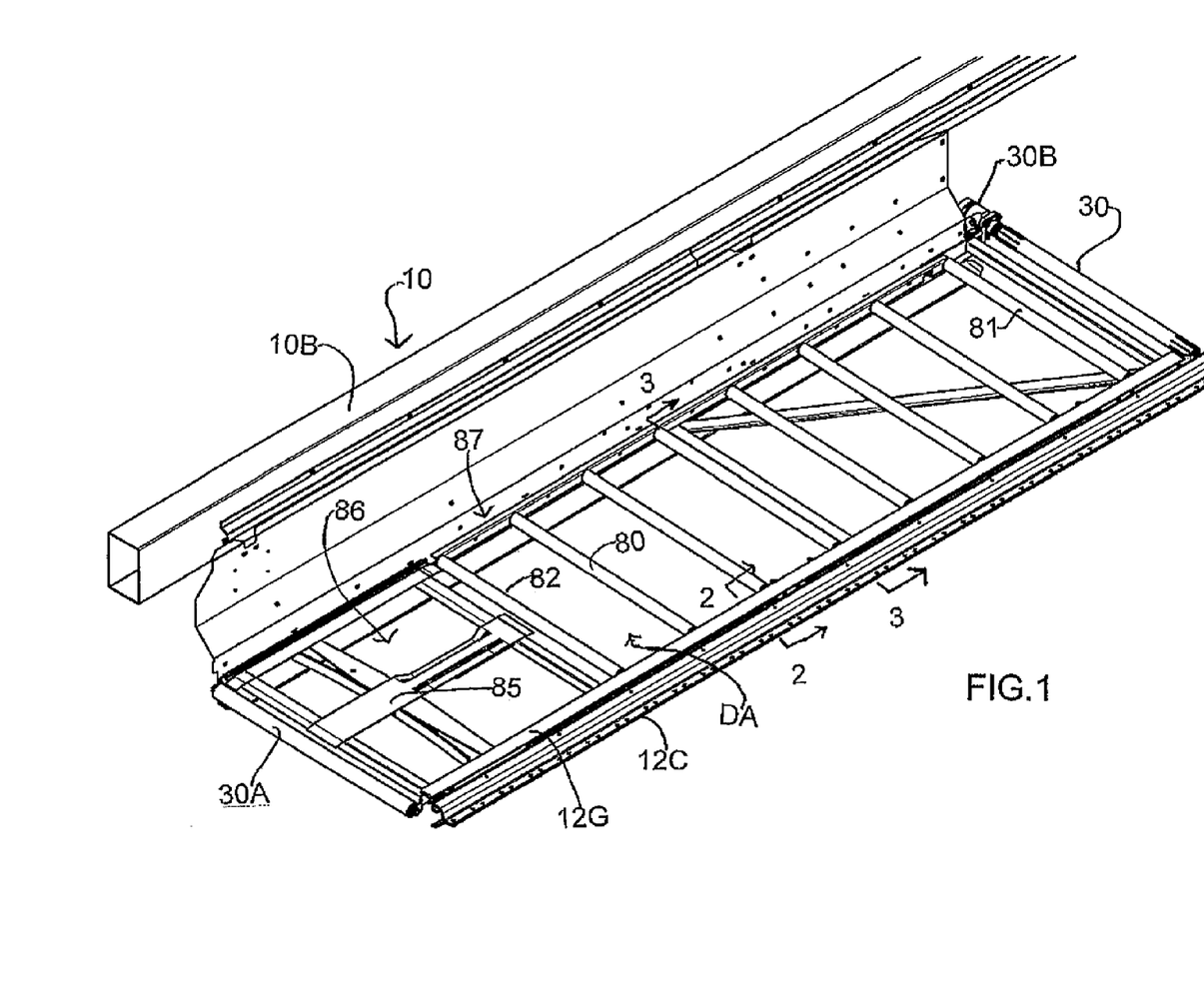
FIG. 1 is an isometric view of the front part of one side only of a header according to the present invention.
Figure 2:
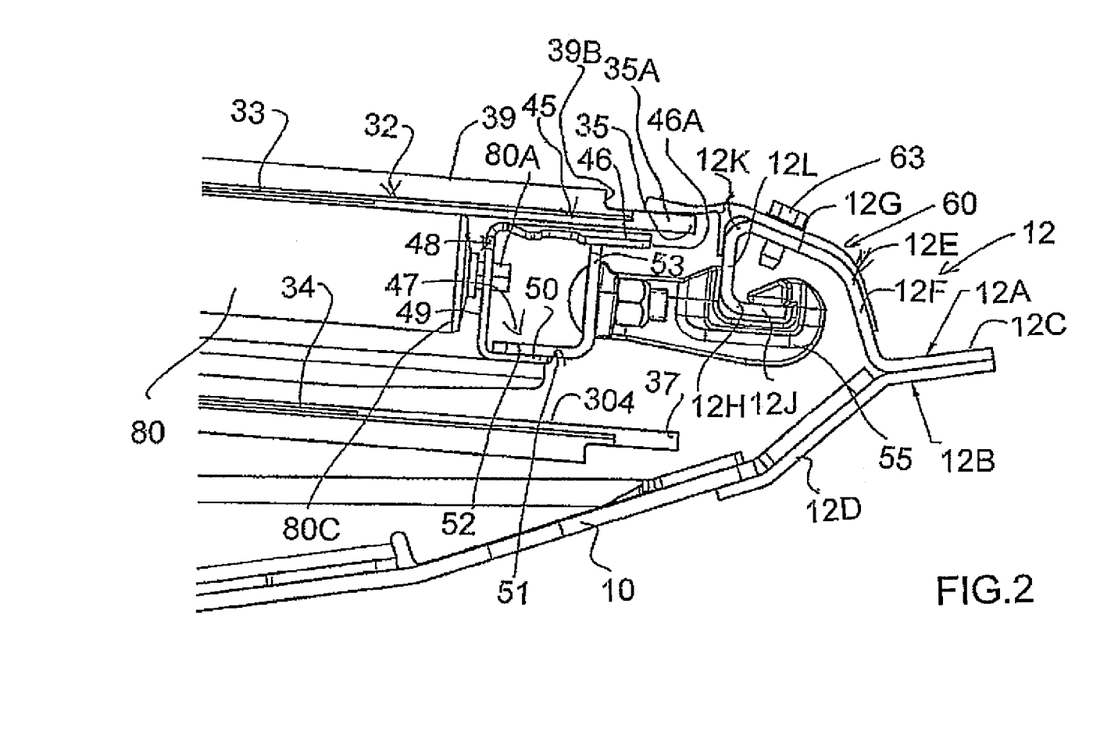
FIG. 2 is a cross sectional view along the lines 2-2 of FIG. 1 showing the front part of the header and draper at the cutter bar.
Figure 3:
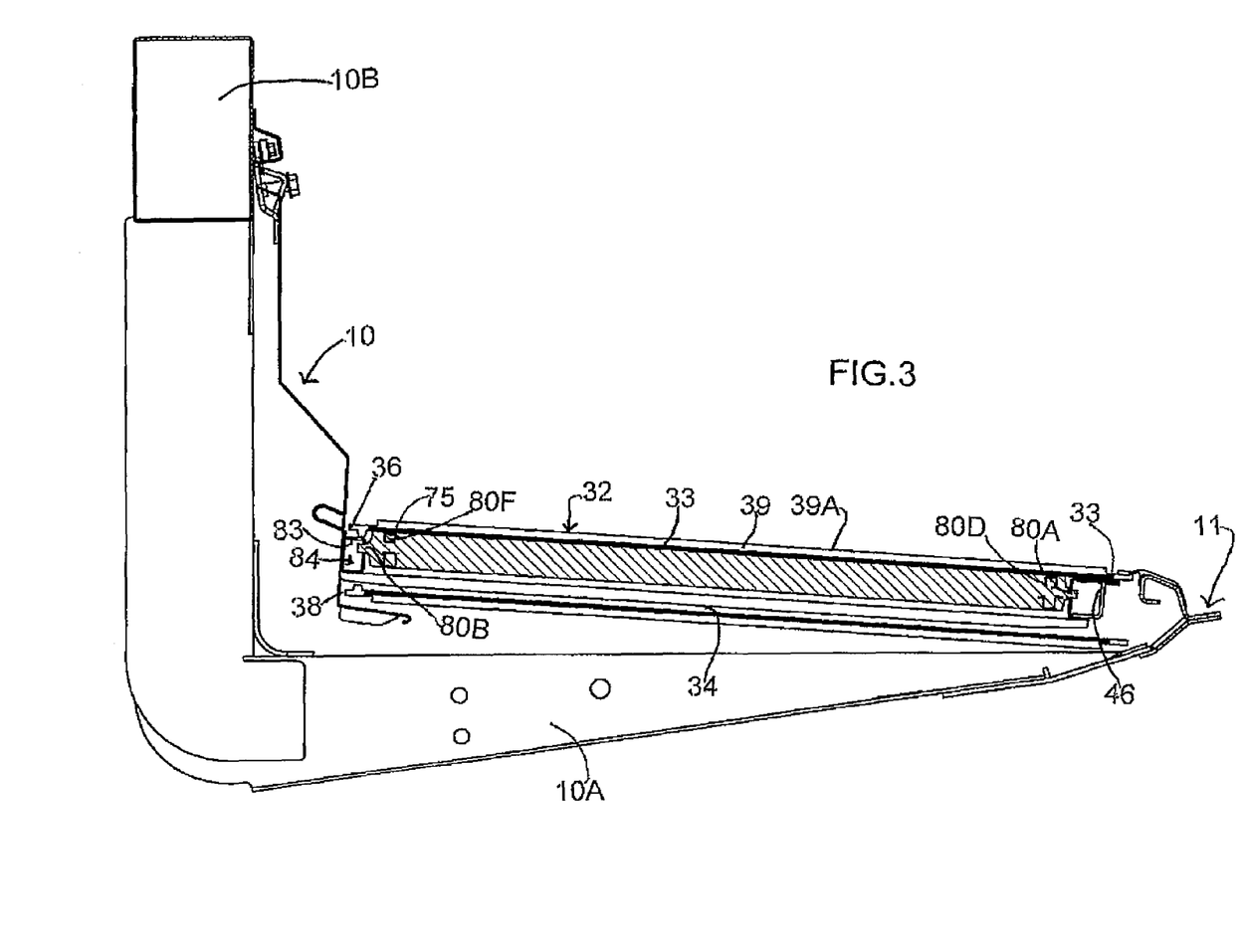
FIG. 3 is a cross sectional view along the lines 3-3 of FIG. 1.
Figure 4:
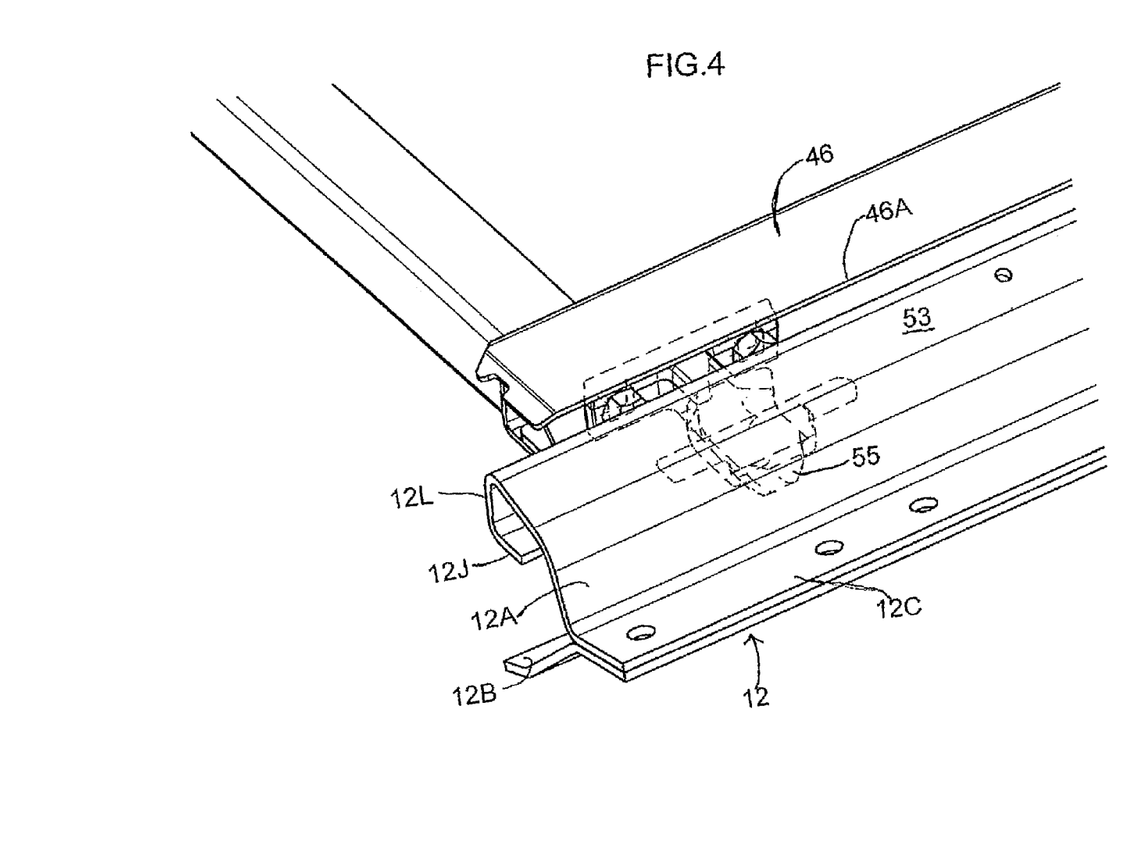
FIG. 4 is an isometric view showing the mounting of the front rail on the cutter bar.
Figure 5:
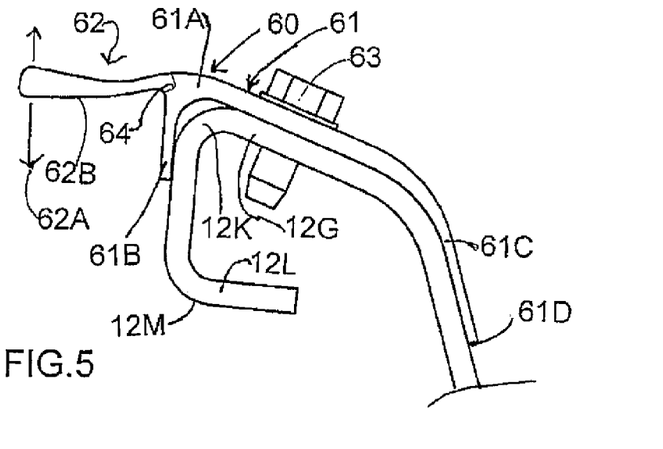
FIG. 5 is an enlarged cross sectional view through the sealing member of FIG. 2.
Figure 6:
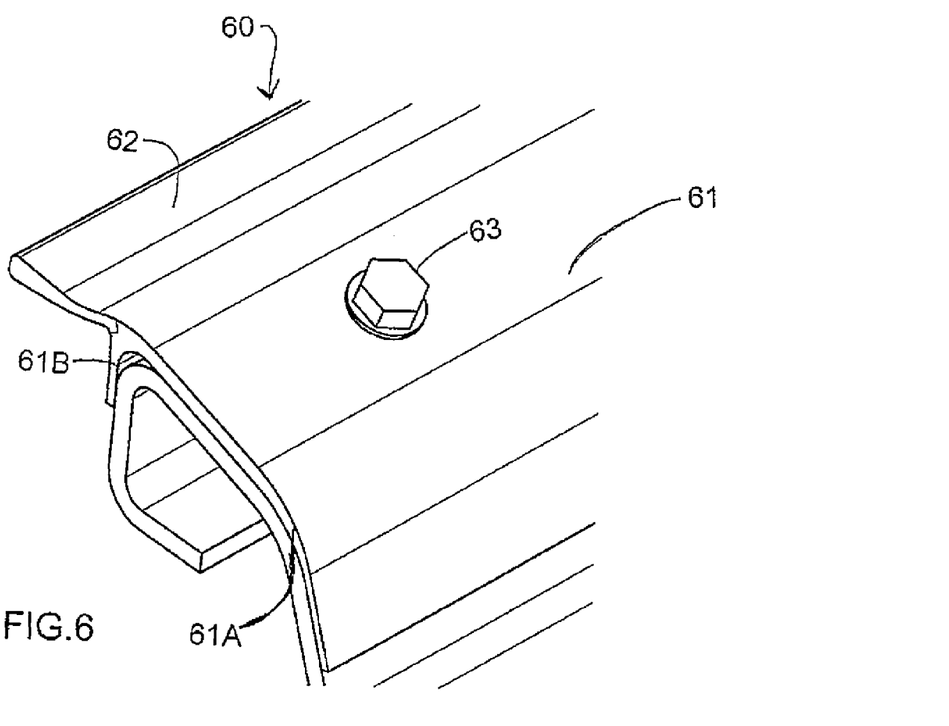
FIG. 6 is an isometric view of the sealing member of FIG. 2.

Turning now to FIGS. 1 and 3, it will be noted that the upper run 33 of the draper 32 is carried on a plurality of support rollers 80 parallel to the first and second rollers 30, 30A for supporting the upper run of the draper at spaced positions therealong. Thus the belt is supported by the rollers 80 between a first end roller 81 adjacent the roller 30 and a second end roller 82 adjacent to but spaced from the roller 30A.

In the area between the rollers 80 and 81 is no skid plate centrally of the upper run of the draper between each support roller and the next for supporting the draper as it is wholly carried in the central areas on the rollers. The front edge of the draper if it sags can engage the support plate 46 along the front edge strip. Similarly a rear edge is carried on a surface 83 of a rear rail 84.

However in a part of the length of the upper run between the roller 82 and the roller 30A there are no rollers and the upper run is carried on at least one central skid plate 85. The section including the skid plate 85 forms a tensioning section 86 carrying the roller 30A and movable to increase a spacing between the first and second rollers 30, 30A to hold the draper tensioned. There are no rollers in the movable tensioning section 86 and the upper run is carried on at least one center skid plate 85.

The first and second rollers 30, 30A and the support rollers 80 are carried on a draper deck 87 which can be fixed or can be slidable along the header. The draper deck 87 includes the cross channel 47 and the rear rail 84 extending along the draper assembly. The rollers 80 are carried between the front and rear rails. The front rail is carried on the plurality of hanger members 55 connected to the cutter bar 12 and extending rearwardly therefrom at spaced portions along the cross-channel 47. These allow the cross-channel 47 to slide along the cutter bar when required to move the position of the discharge opening.

Each roller 80 has a support shaft 80A at the front and 80B at the rear extending axially beyond the end of the roller 80C for support and the roller rotates on a bearing 80C, 80D mounted on the shaft 80A, 80B respectively.

Thus the rollers 80 provide an improved support for the upper run allowing the friction in the draper and its drive to be reduced.

The invention claimed is:

1. Apparatus for cutting and transporting a standing crop comprising:
    an elongate cutter bar for cutting the crop;
    a draper assembly rearward of the cutter bar for transporting the crop longitudinally of the header;
    the draper assembly including a first and a second draper guide roller each arranged at a respective end of the draper assembly spaced apart along the cutter bar with an axis of each guide roller arranged substantially at right angles to the cutter bar;
    the draper assembly including a continuous loop of flexible material arranged to be wrapped around the rollers so as to define an upper run of the flexible material on top of the rollers and a lower run of the flexible material draper canvas below the rollers;
    wherein the flexible material includes a front edge of the upper run of the flexible material arranged at a position adjacent to but spaced from the cutter bar;
    and a sealing member sealing a space between the cutter bar and the front edge of the flexible material with the sealing member extending along and mounted on the cutter bar, the sealing member extending from a first end edge of the sealing member to a second end edge of the sealing member spaced longitudinally of the sealing member;
    wherein the sealing member is an integral plastics extrusion;
    the sealing member having along a full length of the sealing member between the first and second end edges of the sealing member a cross-section which is constant;
    and wherein the sealing member is extruded to define a first portion attached to the cutter bar and a second flexible blade portion which extends rearwardly from the first portion at the cutter bar to lie over and in contact with a front edge portion of the upper run of the flexible material adjacent the front edge.

2. The apparatus according to claim 1 wherein the front edge portion of the flexible material includes a thickened layer of rubber so that an underside of the second flexible blade portion runs along an upper surface of the thickened layer of rubber.

3. The apparatus according to claim 1 wherein the cutter bar includes an upper wall extending rearwardly to a position adjacent to and spaced forwardly of the front edge of the flexible material and a depending rear wall extending downwardly from the upper wall between the upper wall and the front edge and wherein the first portion includes an upper leg lying along the upper wall of the cutter bar and a depending leg extending downwardly from the upper leg along the depending wall between the upper wall and the front edge of the flexible material.

4. The apparatus according to claim 3 wherein the second flexible blade portion is connected to the first portion at or adjacent a junction between the upper leg and the depending leg.

5. The apparatus according to claim 3 wherein the first portion includes an arch shaped portion of the upper leg depending downwardly at a front of the cutter bar so as to cover upper and front surfaces of the cutter bar.

6. The apparatus according to claim 1 wherein the first portion is bolted in place on the cutter bar at spaced positions along the cutter bar.

7. The apparatus according to claim 1 wherein the second flexible blade portion is free to flex upwardly and downwardly at all positions therealong from the cutter bar rearwardly.

8. The apparatus according to claim 1 wherein there is provided a support surface engaging the flexible material rearwardly of the front edge so that the front edge portion of the flexible material is cantilevered beyond the support surface and wherein the second flexible blade portion contacts the flexible material at the cantilevered front edge portion.

9. Apparatus for cutting and transporting a standing crop comprising:
    an elongate cutter bar for cutting the crop;
    a draper assembly rearward of the cutter bar for transporting the crop longitudinally of the header;
    the draper assembly including a first and a second draper guide roller each arranged at a respective end of the draper assembly spaced apart along the cutter bar with an axis of each guide roller arranged substantially at right angles to the cutter bar;
    the draper assembly including a continuous loop of flexible material arranged to be wrapped around the rollers so as to define an upper run of the flexible material on top of the rollers and a lower run of the flexible material below the rollers;
    wherein the flexible material includes a front edge of the upper run of the flexible material arranged at a position adjacent to but spaced from the cutter bar;
    and a sealing member sealing a space between the cutter bar and the front edge of the flexible material with the sealing member extending along and mounted on the cutter bar, the sealing member extending from a first end edge of the sealing member to a second end edge of the sealing member spaced longitudinally of the sealing member;
    wherein the sealing member is an integral plastics extrusion;
    the sealing member having along a full length of the sealing member between the first and second end edges of the sealing member a cross-section which is constant;
    wherein the sealing member is extruded to define a first portion attached to the cutter bar and a second flexible blade portion which extends rearwardly from the first portion at the cutter bar to lie over and in contact with a front edge portion of the upper run of the flexible material adjacent the front edge;
    and wherein the first portion and the second flexible blade portion comprise respectively first and second plastics materials, where the first plastics material forming the first portion is stiffer than the second plastics material forming the second flexible blade portion.

10. The apparatus according to claim 9 wherein the second plastics material forming the second flexible blade portion transitions to the first plastics material forming the first portion at the cutter bar so that the whole of the second flexible blade portion from the cutter bar can flex upwardly and downwardly.

11. The apparatus according to claim 9 wherein the front edge portion of the flexible material includes a thickened layer of rubber so that an underside of the second flexible blade portion runs along an upper surface of the thickened layer of rubber.

12. The apparatus according to claim 9 wherein the cutter bar includes an upper wall extending rearwardly to a position adjacent to and spaced forwardly of the front edge of the flexible material and a depending rear wall extending downwardly from the upper wall between the upper wall and the front edge and wherein the first portion includes an upper leg lying along the upper wall of the cutter bar and a depending leg extending downwardly from the upper leg along the depending wall of the cutter bar between the upper wall and the front edge of the flexible material.

13. The apparatus according to claim 12 wherein the second flexible blade portion is connected to the first portion at or adjacent a junction between the upper leg and the depending leg.

14. The apparatus according to claim 12 wherein the first portion includes an arch shaped portion of the upper leg depending downwardly at a front of the cutter bar so as to cover upper and front surfaces of the cutter bar.

15. The apparatus according to claim 9 wherein the first portion is bolted in place on the cutter bar at spaced positions along the cutter bar.

16. The apparatus according to claim 9 wherein the second flexible blade portion is free to flex upwardly and downwardly at all positions therealong from the cutter bar rearwardly.

17. The apparatus according to claim 9 wherein there is provided a support surface engaging the flexible material rearwardly of the front edge so that the front edge portion of the flexible material is cantilevered beyond the support surface and wherein the second flexible blade portion contacts the flexible material at the cantilevered front edge portion.

* * * * *